United States Patent
McCauley et al.

(10) Patent No.: US 11,084,892 B2
(45) Date of Patent: Aug. 10, 2021

(54) METHODS FOR PRODUCING POLYDIENES

(71) Applicant: Bridgestone Corporation, Chuo-ku (JP)

(72) Inventors: Kevin M. McCauley, Akron, OH (US); Terrence E. Hogan, Uniontown, OH (US)

(73) Assignee: Bridgestone Corporation, Chuo-ku (JP)

( * ) Notice: Subject to any disclaimer, the term of this patent is extended or adjusted under 35 U.S.C. 154(b) by 195 days.

(21) Appl. No.: 16/345,861

(22) PCT Filed: Oct. 31, 2017

(86) PCT No.: PCT/US2017/059295
§ 371 (c)(1),
(2) Date: Apr. 29, 2019

(87) PCT Pub. No.: WO2018/081799
PCT Pub. Date: May 3, 2018

(65) Prior Publication Data
US 2019/0276570 A1    Sep. 12, 2019

Related U.S. Application Data

(60) Provisional application No. 62/414,857, filed on Oct. 31, 2016.

(51) Int. Cl.
| | |
|---|---|
| *C08F 36/06* | (2006.01) |
| *C08F 136/06* | (2006.01) |
| *C08F 4/54* | (2006.01) |
| *C08F 2/42* | (2006.01) |
| *C08F 2/38* | (2006.01) |

(52) U.S. Cl.
CPC .............. *C08F 136/06* (2013.01); *C08F 2/42* (2013.01); *C08F 4/545* (2013.01); *C08F 36/06* (2013.01); *C08F 2/38* (2013.01); *C08F 2410/01* (2013.01)

(58) Field of Classification Search
CPC .. C08F 136/06; C08F 2/02; C08F 2/38; C08F 4/52; C08F 4/545
See application file for complete search history.

(56) References Cited

U.S. PATENT DOCUMENTS

| | | | |
|---|---|---|---|
| 4,429,091 A * | 1/1984 | Hall | ........................ C08F 36/04 502/157 |
| 4,461,883 A | 7/1984 | Takeuchi et al. | |
| 8,202,944 B2 | 6/2012 | Suzuki et al. | |
| 8,232,352 B2 | 7/2012 | Matsushita et al. | |
| 8,324,329 B2 * | 12/2012 | Luo | ........................... C08F 2/01 526/78 |
| 8,927,644 B2 * | 1/2015 | Hamann | .................... C08F 4/48 524/575 |
| 8,962,752 B2 | 2/2015 | Matsushita et al. | |
| 8,981,020 B2 | 3/2015 | Luo et al. | |
| 9,000,109 B2 * | 4/2015 | Hamann | ............... C08F 236/10 526/180 |
| 9,062,017 B2 * | 6/2015 | Hogan | .................... C08F 36/06 |
| 9,243,099 B2 * | 1/2016 | Valenti | ...................... C08L 9/06 |
| 2009/0043046 A1 | 2/2009 | Luo et al. | |
| 2011/0112212 A1 | 5/2011 | Kimura et al. | |
| 2011/0172369 A1 | 7/2011 | Yan et al. | |

FOREIGN PATENT DOCUMENTS

| | | |
|---|---|---|
| EP | 1939221 A2 | 7/2008 |
| EP | 2495267 A1 | 9/2012 |
| EP | 2537872 A1 | 12/2012 |
| EP | 2516410 B1 | 4/2014 |
| WO | 2014040640 | 3/2014 |

OTHER PUBLICATIONS

Iovu, et al.; Butadiene Polymerisation Using Binary Neodymium-Based Catalyst Systems. The Effect of Catalyst Preparation; Euro. Polym. J., 1997, vol. 33, No. 6, pp. 811-814.
Yang, et al.; New binary Lanthanide Catalysts for Stereospecific Diene Polymerization; Macromolecules, 1982, No. 15, pp. 230-233.
Database WPI Week 201501; Apr. 24, 2020; Thomson Scientific, London, GB; AN 2014-W51895; XP002798819 & CN 104059196 A (Beijing Res. Inst. Chem), Sep. 24, 2014; Abstract.
Database WPI Week 201551; Apr. 24, 2020; Thomson Scientific, London, GB; AN 2014-40356Y; XP002798820 & CN 10455841 A (Beijing Res. Inst. Chem), Sep. 29, 2015; Abstract.

* cited by examiner

*Primary Examiner* — Rip A Lee
(74) *Attorney, Agent, or Firm* — Meredith E. Hooker; J. Gregory Chrisman

(57) ABSTRACT

Methods are described for the preparation of polymers using a lanthanide-based coordination catalyst and arresting polymerization using a reduced amount of a Lewis base while retaining the reactivity of the polymer chain ends toward functionalization agents. The Lewis base is a meso-enriched oxolanyl Lewis base. The resulting functionalized polymer has a higher level of purity and can be used in products such as tires.

20 Claims, No Drawings

METHODS FOR PRODUCING POLYDIENES

TECHNICAL FIELD

The present disclosure relates to a method for producing polymers with a coordination catalyst and inhibiting the polymerization with a Lewis base, and more particularly, to selective inhibition of the polymerization with a meso-isomer enriched Lewis base.

BACKGROUND

Synthetically produced polymers such as polydienes are routinely used in the manufacturing of rubber compositions, for instance, tires. Tires are manufactured having various compounding properties that depend on the application in which the tire will be used. The desired tire properties are able to be introduced by functionalization of the reactive ends of the formed polymer using functionalization agents. There are different types of processes that can be used in the polymerization of dienes. For instance, polymerization can occur in solution where a solvent is present or in bulk where a solvent is absent or substantially absent. These processes can occur in either a batch or a continuous process. Bulk polymerizations must be carefully set up and monitored to avoid an uncontrolled temperature increase which could lead to a runaway reaction or otherwise compromise the polymerization.

Solution and bulk polymerization of monomers can be facilitated by using a coordination catalyst such as a lanthanide-based catalyst system. The resulting polymerization can be arrested by the addition of a Lewis base, such as an oligomeric oxolanyl compound, which preserves the reactivity of the polymer chain ends and allows for the functionalization of the chain ends by reacting with a functionalization agent. Arresting the polymerization by the addition of an oligomeric oxolanyl compound also allows for the transfer of the polymer cement from one reactor vessel to another or a separate unit operation by preventing an uncontrollable polymerization reaction. However, once the polymerization reaction is complete, the lanthanide catalyst and, to a larger extent, the oligomeric oxolanyl compound remain in the isolated polymer and are considered impurities. As an impurity in the polymer product, the oligomeric oxolanyl compound may impact the compounding properties of the polymer. Therefore, it is desirable to minimize the amount of oligomeric oxolanyl compound needed to arrest the polymerization. It is also desirable to minimize the amount of oxolanyl compound used because it remains in the monomer recycle stream which requires a purification process in order for the monomer to be used again. Having a reduced amount of oxolanyl compound in the recycle stream will provide for a more efficient and less costly monomer purification process.

It is an objective of the present disclosure to alleviate or overcome one or more difficulties related to the prior art. It has been found that an oligomeric oxolanyl compound enriched in the meso-isomer can be used in smaller quantities than typically required to arrest lanthanide-catalyzed polymerizations, for example, bulk polymerization of diene monomers.

SUMMARY

In a first aspect, there is a method for preparing a polymer. The method includes: (a) polymerizing a conjugated diene monomer in the presence of a coordination catalyst to form a reactive polymer having an active terminus; (b) inhibiting said step of polymerizing with a Lewis base selected from:

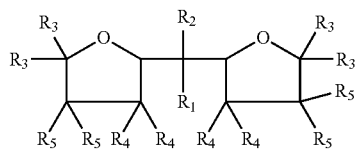

wherein $R_1$ and $R_2$ independently are hydrogen or an alkyl group and the total number of carbon atoms in $—CR_1R_2—$ ranges between one and nine inclusive; $R_3$, $R_4$, and $R_5$ independently are $—H$ or $—C_nH_{2n+1}$ wherein n=1 to 6, wherein at least 60% by weight of the Lewis base is the meso-isomer; and optionally (c) reacting the polymer at its active terminus with a functionalizing agent.

In an example of aspect 1, the coordination catalyst is utilized in an amount of about 0.001 mmol to about 1 mmol of catalyst per 100 g of monomer.

In another example of aspect 1, the meso-isomer Lewis base is utilized in an amount of less than 0.008 mmol of meso-isomer Lewis base per 100 g of monomer.

In another example of aspect 1, the molar ratio of the meso-isomer Lewis base to the coordination catalyst is from about 1:1 to 5:1.

In another example of aspect 1, the molar ratio of the meso-isomer Lewis base to the coordination catalyst is less than 3:1.

In another example of aspect 1, said step of inhibiting substantially reduces the rate at which the monomer is polymerized while maintaining the ability of the active terminus to react with the functionalizing agent.

In another example of aspect 1, said step of inhibiting ceases the polymerization of the monomer.

In another example of aspect 1, at least about 80% by weight of the Lewis base is the meso-isomer.

In another example of aspect 1, at least about 90% by weight of the Lewis base is the meso-isomer.

In another example of aspect 1, the coordination catalyst includes a lanthanide-based catalyst.

In another example of aspect 1, the coordination catalyst includes a neodymium-based catalyst.

In another example of aspect 1, the conjugated diene monomer is 1,3-butadiene that forms cis-1,4-polybutadiene.

In another example of aspect 1, step (a) is carried out in the presence of less than 20 percent by weight of organic solvent based on the total weight of conjugated diene monomer, organic solvent and resulting reactive polymer.

The first aspect may be provided alone or in combination with any one or more of the examples of the first aspect discussed above.

In a second aspect, there is a method for preparing a polymer. The method includes (a) polymerizing a conjugated diene monomer in the presence of a lanthanide-based coordination catalyst to form a reactive polymer having an active terminus; (b) inhibiting said step of polymerizing with a Lewis base selected from:

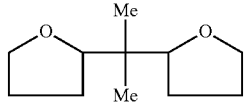

wherein at least 60% by weight of the Lewis base is the meso-isomer; (c) reacting the polymer at its active terminus with a functionalizing agent.

In an example of aspect 2, the coordination catalyst comprises a neodymium-based catalyst.

In another example of aspect 2, at least 80% by weight of the Lewis base is the meso-isomer.

In another example of aspect 2, step (a) is carried out in the presence of less than 20 percent by weight of organic solvent based on the total weight of conjugated diene monomer, organic solvent and resulting reactive polymer.

In another example of aspect 2, step (a) is carried out in the presence of less than 5 percent by weight of organic solvent based on the total weight of conjugated diene monomer, organic solvent and resulting reactive polymer.

In another example of aspect 2, the meso-isomer Lewis base is utilized in an amount of less than 0.008 mmol of meso-isomer Lewis base per 100 g of monomer.

In another example of aspect 2, the molar ratio of the meso-isomer Lewis base to the lanthanide-based coordination catalyst is less than 3:1.

The second aspect may be provided alone or in combination with any one or more of the examples of the first or second aspects discussed above.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features disclosed in this specification and in the drawings can be used in any and all combinations. By way of non-limiting example the various features may be combined with one another as set forth in the specification as aspects.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

Unless specified otherwise, weight percent content of meso-isomer of a Lewis base means the weight percent of the meso-isomer as based on total weight of the Lewis base. In an example, an oxolanyl Lewis base having 70 weight percent of the meso-isomer means that the meso-isomer accounts for 70 percent of the weight of the Lewis base and that non-meso isomer Lewis base (e.g., the D and L isomers of the Lewis base) accounts for the remaining portion and weight of the Lewis base.

The present disclosure relates to a Lewis base-containing composition having a specified amount of the meso-isomer of one or more of the oxolanyl compounds of specified structure and the use of such compositions to arrest coordination catalyst-induced polymerization reactions while preserving the reactivity of the chain ends of the polymer. An oxolanyl compound enriched in the meso-isomer has been found to be more efficient at arresting polymerization than the previously used commercial mixture of meso, D, and L-isomers. Commercially available compositions of oxolanyl compounds, such as 2,2-di(2'-tetrahydrofuryl)propane contain a mixture of approximately 50% meso-isomer and approximately 50% D- and L-isomers. The use of meso-isomer enriched Lewis bases in coordination catalyst-induced polymerization reactions can result in a reduced use of total Lewis base and fewer impurities in the polymer product as compared to use of Lewis bases having a conventional amount of meso-isomer, for example, a 50 weight percent mixture of meso-isomer and D- and L-isomers.

Embodiments disclosed herein relate to an oxolanyl Lewis base or like-containing composition having at least 60% by weight of the meso-isomer based on the total weight of the Lewis base of one or more of the oxolanyl Lewis bases. The at least one Lewis base is selected from the group:

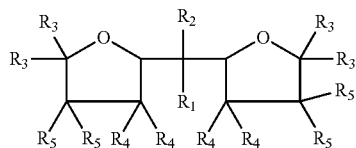

wherein $R_1$ and $R_2$ independently are hydrogen or an alkyl group and the total number of carbon atoms in —$CR_1R_2$— ranges between one and nine inclusive; $R_3$, $R_4$, and $R_5$ independently are —H or —$C_nH_{2n+1}$ wherein n=1 to 6. The oxolanyl Lewis base has at least 60% by weight of the meso-isomer with the remainder of the composition being the D and L isomers. The oxolanyl Lewis base composition can be added to a polymerization mixture containing monomer and catalyst (e.g., a coordination catalyst) to arrest or inhibit the polymerization reaction. Other embodiments can include the use of oxolanyl Lewis bases having at least 65, 70, 75, 80, 85 or 90% by weight of the meso-isomer based on the total weight of the Lewis base added to a polymerization reaction.

In one or more embodiments, the oxolanyl Lewis base composition mixture may be commercially obtained and then purified using a chromatographic method as in U.S. Pat. No. 9,062,017 or a distillation method to yield a composition that contains the 100%, >90%, >80%, >70% or >60% meso-isomer by weight based on the total weight of the Lewis base. In other embodiments, the oxolanyl Lewis base composition may be synthesized to yield a composition that contains the 100%, >90%, >80%, >70% or >60% meso-isomer by weight.

In another embodiment, the at least 60% or more by weight of the meso-isomer of the oxolanyl Lewis base composition can be used in a polymerization process, for example, polymerization of conjugated dienes. The polymerization of monomer (e.g., a conjugated diene monomer) in the presence of a coordination catalyst can be inhibited by the addition of an oxolanyl Lewis base selected from the group:

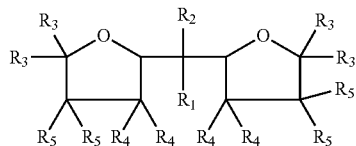

wherein $R_1$ and $R_2$ independently are hydrogen or an alkyl group and the total number of carbon atoms in —$CR_1R_2$— ranges between one and nine inclusive; $R_3$, $R_4$, and $R_5$ independently are —H or —$C_nH_{2n+1}$ wherein n=1 to 6.

Although the polymerization can be inhibited by the oxolanyl Lewis base, the polymer may retain reactivity at the chain ends and is then able to react with a functionalizing agent to further diversify the polymer product that will impart desired performance properties, for example, that may be advantageous to a tire. Further embodiments include the use of greater than 65%, 70%, 75%, 80% or 90% by weight meso-isomer based on the total weight of the Lewis base, for example, as it is added to a polymerization reaction in the presence of a coordination catalyst. The inhibition of polymerization by an oxolanyl Lewis base is thought to occur from the coordination of the Lewis base to the polymerization catalyst such as a lanthanide-containing catalyst.

In one embodiment, the meso-isomer enriched Lewis base is 2,2-di(2'-tetrahydrofuryl)propane. For example, the 2,2-di(2'-tetrahydrofuryl)propane can contain greater than 60, 65, 70, 75, 80, 85 or 90% by weight of the meso-isomer based on the total weight of 2,2-di(2'-tetrahydrofuryl)propane added to a polymerization reaction. The molecular structure of the oxolanyl Lewis base 2,2-di(2'-tetrahydrofuryl)propane contains 2 stereo centers and thus would exist as 4 diastereomers. However, 2 of the diastereomers that have the RS and SR configurations are the same molecule due to the internal symmetry of the molecule which would be considered the meso-isomer. The remaining 2 diastereomers have the SS and RR configuration and are enantiomers. The present disclosure shows that the stereochemistry of 2,2-di(2'-tetrahydrofuryl)propane is important for the efficiency of inhibition of the polymerization of monomers, for example, conjugated dienes, that is mediated by a coordination catalyst such as a lanthanide-containing catalyst.

There are at least four different types of chain polymerization initiation mechanisms: radical or free-radical, cationic, anionic, and coordination. The present disclosure includes coordination polymerizations. A radical chain polymerization is initiated either by the spontaneous formation of a radical on an active site the monomer or by small quantities of an initiator, usually a peroxide or an azo compound, upon exposure to heat, light, or high-energy irradiation. The initiation of a cationic chain polymerization provides a carbenium ion or positive charge on the monomer. Some initiators of cationic chain polymerization include strong protonic acids, Lewis acids, or other carbenium ion salts. Due to the high reactivity of the carbenium ion, the type of monomer that can be used in a cationic chain polymerization is limited to those that are able to stabilize the resulting carbenium ion such as isobutylene where the positive charge is stabilized via a tertiary carbenium ion or monomers with electron-donating groups such as vinyl ethers or a styrene-like monomer which is able to delocalize the positive charge around the aryl ring. Anionic chain polymerization is initiated by a strong nucleophile such as a Grignard reagent or other organometallic compounds such as organolithiums. The initiator in an anionic polymerization reaction will add to a double bond of the monomer making a covalent bond with the monomer and produce a resulting carbanion which is then able to add to another monomer unit and the process continues growing the polymer chain. Coordination polymerizations use a complex catalyst system containing either a transition metal or a lanthanide and an organometallic compound usually from a group IA or IIIA metal of the periodic table. Not bound by any theory, the mechanism of coordination polymerizations is believed to proceed by forming transient pi-complexes between the monomer and transition metal or lanthanide species which then gives a metal-alkyl complex. The polymer chain then grows by the repetitive insertion of each monomer unit into the metal-alkyl complex until the polymerization is optionally functionalized by the addition of a functionalizing agent and/or terminated by a terminating agent.

In one or more embodiments, the coordination polymerizations carried out in the present disclosure utilize a transition metal catalyst or, more preferably, a lanthanide-containing catalyst system and the addition of a meso-isomer enriched oxolanyl Lewis base. The catalyst system contains a group of reagents that, when combined together and then aged for a period of time, form an active catalyst. The active catalyst may be pre-formed outside of the polymerization reaction vessel or formed in situ inside of the polymerization reaction vessel in the presence of most or all of the reactants. An organic solvent may or may not be present during catalyst formation and depends whether a commercial catalyst reagent, or a synthetically prepared catalyst reagent, is used as a solution in an organic solvent. Pre-formed catalysts can include the combination of a small amount of conjugated diene monomer, a coordination catalyst such as a lanthanide reagent, one or more organoaluminum reagents, and a halogen-containing reagent that serves as a halogen source. The term "organoaluminum" refers to any aluminum compound having at least one aluminum-carbon bond, for example, aluminoxane. In one or more embodiments, organoaluminum compounds other than aluminoxanes include those represented by the formula $AlR_nX_{3-n}$, wherein each R, which may be the same or different, is a monovalent organic group attached to the aluminum atom through a carbon atom, wherein each X, which may be the same or different, is a carboxylate group, an alkoxide group, a hydrogen atom, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, aralkyl, alkaryl, allyl, and alkynyl groups. These hydrocarbyl groups may also contain heteroatoms such as, but not limited to, nitrogen, oxygen, boron, silicon, sulfur, and phosphorus atoms.

For the halogen source, various halide-containing compounds or mixtures can be used in the synthesis of this catalyst system. Halide-containing compounds useful in the present disclosure are those that include at least one atom of fluorine, chlorine, bromine, iodine, and astatine. For example, bromine-containing mixed halogens can include at least one bromine atom bonded to at least one other halogen atom that is not bromine. Suitable mixed halogens containing bromine include, for example, bromine monofluoride, bromine trifluoride, bromine pentafluoride, bromine monochloride, and iodine monobromide.

The resulting catalyst mixture is then aged at a designated temperature for a pre-determined duration to activate the catalyst system which is then added to a reaction vessel that contains the remainder of conjugated diene monomer in addition to an amine. The resulting reaction mixture undergoes polymerization of the conjugated diene monomer at a desired temperature for a desired duration depending on the desired conversion.

For example, the reaction conditions under which the polymerization proceeds (e.g., in a vessel) may be carried out include maintaining the temperature of the polymerization mixture within a range from −10° C. to 35° C., 0° C. to 30° C., or 10° C. to 25° C. In other examples, the polymerization can be carried out at a peak polymerization temperature of less than 110° C., less than 80° C., less than 50° C., less than 35° C., less than 30° C., less than 28° C., or less than 25° C. In one or more embodiments, the polymerization reaction within the polymerization vessel can be carried out under anaerobic conditions at low temperatures and at or below the vapor pressure of the monomer at the polymerization temperature. In the presence of an organic solvent, the solvent can impact the vapor pressure at which the process is conducted. Irrespective of the bulk polymerization or copolymerization process carried out, polymerization or copolymerization should be carried out at temperatures sufficiently high to ensure reasonable polymerization or copolymerization rates and avoid unduly long reactor residence times, but not so high as to result in the production of unreasonably high levels of strings and lumps due to excessively rapid polymerization or copolymerization rates.

The polymerization or copolymerization time will generally range from about 30 minutes to 60 minutes to several hours, for example, 2 or 3 hours. Thus, the fresh monomer being fed to the polymerization vessel can have an average residence time in the range of 30 minutes to 2 hours, and more preferably 30 minutes to 90 minutes before being reacted and/or exiting the vessel in a polymerization mixture.

The amount of coordination catalyst needed to facilitate polymerization of a monomer (e.g., a conjugated diene monomer) can be varied from about 0.001 mmol catalyst per 100 g of monomer to about 1 mmol catalyst per 100 g of monomer, or from about 0.01 to 0.1 mmol catalyst per 100 g of monomer. The amount of organoaluminum reagents needed to facilitate polymerization of a conjugated diene monomer can be varied independently from about 0.01 mmol organoaluminum reagent per 100 g of monomer to about 1 mmol organoaluminum reagent per 100 g of monomer, or about 0.1 to 0.5 mmol organoaluminum reagent per 100 g of monomer. The amount of monomer that is used for pre-forming the catalyst can be varied from a ratio of 10 mole of monomer to 1 mole of lanthanide catalyst to 600 moles of monomer to 1 mole of lanthanide catalyst, or about a ratio of 50 to 250 moles of monomer to 1 mole of lanthanide catalyst. The amount of halogen-containing reagent needed to facilitate polymerization of a monomer (e.g., a conjugated diene) can be varied from a ratio of about 0.5 mole of halogen-containing reagent per 1 mole of lanthanide coordination catalyst to about 2 mole of halogen-containing reagent per 1 mole of lanthanide coordination catalyst, or about 0.75 to 1.5 mole of halogen-containing reagent per 1 mole of lanthanide coordination catalyst. The molar ratio of amine to lanthanide coordination catalyst needed to facilitate polymerization of a monomer can be varied from about 10:1 to about 80:1 or about 20:1 to 60:1.

The polymerization is allowed to proceed for a predetermined amount of time before the addition of an oxolanyl Lewis base that is greater than 60% meso-isomer by weight to inhibit or substantially inhibit further polymerization. The amount of oxolanyl Lewis base that is >60% meso-isomer by weight that can be added is a ratio of less than 0.008, 0.01, 0.025, 0.05, 0.075, 0.1 or 0.2 mmol of oxolanyl Lewis base per 100 g monomer. The molar ratio of oxolanyl Lewis base to coordination catalyst that is effective in inhibiting or substantially inhibiting further polymerization can be varied from 1:1 to 5:1, 2:1 to 4:1 or about 3:1. Although the polymerization can be inhibited or substantially inhibited by the addition of a Lewis base having >60% by weight of the meso-isomer, further reaction of the polymer is able to take place. For example, the polymer that is inhibited or substantially inhibited from further polymerization by the addition of a Lewis base having >60% by weight of the meso-isomer is able to retain an active terminus that can further react with a functionalizing agent.

A suitable Lewis base having greater than 60%, 65%, 70%, 75%, 80% or 90% by weight of the meso-isomer that can retain an active terminus or inhibit a polymerization is:

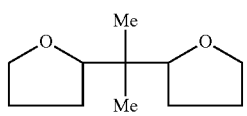 [SMILES: CC(C)(C1CCCO1)C1CCCO1]

After the polymerization inhibition step, the reaction mixture can be optionally transferred to another reactor for functionalization or functionalized in the same reactor. Once the functionalization step is complete, the reaction contents are subjected to a terminating agent such as a mixture of an alkyl alcohol and a phenol. A suitable terminating agent combination is a mixture of isopropanol and 2,6-di-tert-butyl-4-methylphenol.

The present disclosure includes the use of coordination catalysts, such as lanthanide-containing catalysts, in the process of coordination polymerization. The polymerization of conjugated dienes catalyzed by lanthanide-containing catalysts can yield cis-1,4-polydienes or trans-1,4-polydienes depending upon the polymerization reaction conditions. A suitable 1,4-polydiene configuration for the present disclosure is the cis-configuration. Lanthanide-containing catalysts may contain lanthanum, cerium, praseodymium, neodymium, promethium, samarium, europium, gadolinium, terbium, dysprosium, holmium, erbium, thulium, ytterbium, or lutetium. The lanthanide-containing catalysts may be in the form of an elemental lanthanide.

The lanthanide-containing catalyst may be in a salt form where the lanthanide is in an oxidation state including, but not limited to, +2, +3, and +4. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In certain embodiments, the lanthanide-containing catalysts can include neodymium compounds. However, those skilled in the art will be able to choose similar compounds that contain other lanthanides.

In one or more embodiments, a coordination polymerization facilitated by a lanthanide-containing catalyst may be used in solution phase polymerization in which a solvent is present, such as a hydrocarbon solvent, or in a bulk polymerization in which the solvent is absent or substantially absent.

The present disclosure includes the use of conjugated diene monomers. Conjugated dienes that may be used in the polymerization processes include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1,3-pentadiene, 4-methyl-1,3-pentadiene, and 2,4-hexadiene. Mixtures of two or more conjugated dienes may also be used in co-polymerization processes. The preferred conjugated dienes are 1,3-butadiene, isoprene, 1,3-pentadiene, and 1,3-hexadiene.

The present disclosure includes the use of aluminum reagents, such as organoaluminum reagents, in the formation of the catalyst system. Organoaluminum reagents include compounds represented by the general formula $AlR_nX_{3-n}$ where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. Organoaluminum reagents may be used as a solution in an organic solvent. The types of organoaluminum compounds include, but are not limited to, aluminoxane or modified aluminoxane, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. One or more of a trihydrocarbylaluminum, dihydrocarbylaluminum, and/or aluminoxane, or a combination thereof is preferred. A combination of trimethylaluminum, diisobutylaluminum hydride, and methylaluminoxane is more preferred.

The present disclosure includes the use of halogenating reagents such as organic halides as a halogen source as discussed above. A suitable organic halide is carbon tetrabromide (also named tetrabromomethane).

The present disclosure includes the use of amines such as aromatic amines as known to one skilled in the art. For example, suitable aromatic amines include, but are not limited to, pyridine.

The present disclosure includes the use of functionalizing agents. Suitable functionalizing agents include ketones, nitriles, quinones, aldehydes, amides, esters, isocyanates, isothiocyanates, epoxides, imines, aminoketones, aminothioketones, and acid anhydrides. Suitable functionalizing agents include, but are not limited to, bis(diethylamino) benzophenone and 2-pyridinecarbonitrile.

The polymerization reaction product or mixture can be further processed as known in the art. The polymer product from the reaction mixture can be recovered by using techniques known in the art. For example, desolventization and drying techniques may be used (e.g., the polymer can be recovered by passing the reaction mixture through a heated screw apparatus, such as a desolventizing extruder, in which the volatile substances are removed by evaporation at appropriate temperatures (100° C. to 170° C.) and under atmospheric or sub-atmospheric pressure). This treatment serves to remove unreacted monomer as well as any low-boiling solvent. Alternatively, the polymer can also be recovered by subjecting the reaction mixture to steam desolventization, followed by drying the resulting polymer crumbs in a hot air tunnel. The polymer can also be recovered by directly drying the reaction mixture on a drum dryer.

In one or more embodiments, the polymers prepared according to this disclosure can be vulcanizable. In one or more embodiments, the polymers can have a glass transition temperature ($T_g$) that is less than 0° C., less than −20° C., or less than −30° C. In one example, the polymers can exhibit a single glass transition temperature. In another example, the polymers may be hydrogenated or partially hydrogenated.

In one or more embodiments, the polymers of this invention may be cis-1,4-polydienes having a cis-1,4-linkage content that is greater than 97%, greater than 97.5%, greater than 98.0%, or greater than 98.5%, where the percentages are based upon the number of diene mer units adopting the cis-1,4-linkage versus the total number of diene mer units. The polymers can have a 1,2-linkage content that is less than about 1.0%, less than 0.8%, less than 0.7%, or less than 0.6%, where the percentages are based upon the number of diene mer units adopting the 1,2-linkage versus the total number of diene mer units. The balance of the diene mer units may adopt the trans-1,4-linkage.

The number average molecular weight ($M_n$) of the produced polymers can be from 1,000 to 1,000,000; 5,000 to 200,000; 25,000 to 50,000; or 50,000 to 120,000; as determined by using gel permeation chromatography (GPC) calibrated with polystyrene standards and Mark-Houwink constants for the polymer in question. In one or more embodiments, the molecular weight distribution or polydispersity ($W_w/M_n$) of produced polymers can be less than 3.0, less than 2.9, less than 2.6, less than 2.5, less than 2.3, less than 2.1, less than 2.0, or less than 1.9.

The Mooney viscosity ($ML_{1+4}$@100° C.) of the produced polymers can be less than 100, less than 90, less than 80, less than 70, less than 60, less than 50, less than 40, or less than 25. The gel content of the produced polymers can be less than 20% by weight, less than 10% by weight, less than 7% by weight, less than 5% by weight, less than 3% by weight, or less than 2% by weight, as determined by measuring, at room temperature, the amount of toluene-insoluble material in the polymers.

The polymers of this disclosure are particularly useful in preparing rubber compositions that can be used to manufacture tire components. Rubber compounding techniques and the additives employed therein are generally disclosed in The Compounding and Vulcanization of Rubber, in Rubber Technology ($2^{nd}$ Ed. 1973).

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular rubbers, fillers, and other ingredients (e.g., functionalizing agent, curative, etc.) utilized in the examples should not be interpreted as limiting since other such ingredients consistent with the disclosure in the Detailed Description can utilized in substitution. That is, the particular ingredients in the compositions, as well as their respective amounts and relative amounts should be understood to apply to the more general content of the Detailed Description.

In the following examples, the Mooney viscosities ($ML_{1+4}$) of the polymer samples were determined at 100° C. by using a Monsanto Mooney viscometer with a large rotor, a one-minute warm-up time, and a four minute running time. The number average (Mn) and weight average (Mw) molecular weights of the polymer samples were determined by gel permeation chromatography. The gel permeation chromatography instrument was equipped with a differential refractive index detector and an ultraviolet absorption detector. The gel permeation chromatography ultraviolet/refractive index ratio, which is the ratio of the ultraviolet detector signal to the refractive index detector signal, was used to calculate the percent functionality of the polymer samples by referencing the gel permeation chromatography ultraviolet/refractive index ratio of the functionalized cis-1,4-polybutadiene to the ultraviolet/refractive index ratio of a functionalized polybutadiene sample that is produced by using anionic polymerization and has the same Mn. The cis-1,4-linkage, trans-1,4-linkage, and 1,2-linkage contents of the polymer samples were determined by Fourier transform infrared spectroscopy or by $^{13}$C-NMR spectroscopy.

Example 1

The polymerization reactor consisted of a one-gallon stainless cylinder equipped with a mechanical agitator (shaft and blades) capable of mixing high viscosity polymer cement. The top of the reactor was connected to a reflux condenser-system for conveying, condensing, and recycling the 1,3-butadiene vapor developed inside the reactor throughout the duration of the polymerization. The reactor was also equipped with a cooling jacket chilled by cold water. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer and 3.9 ml of 0.4 M pyridine was charged into the reactor. After the monomer was thermostated at 27° C., the polymerization was initiated by charging into the reactor a preformed catalyst that had been prepared by mixing in the following order 6.5 g of 19.2 wt % 1,3-butadiene in hexane, 0.72 ml of 0.054 M neodymium versatate in hexane, 2.4 ml of 1.5 M methylaluminoxane in toluene, 0.39 ml of 2.0 M trimethylaluminum in hexane, 1.9 ml of 1.0 M diisobutylaluminum hydride in hexane, and 1.56 ml of 0.025 M tetrabromomethane in hexane and allowing the mixture to age for 15 minutes. After 17.5 minutes from its commencement, the polymerization mixture was treated with 7.8 ml of 0.01 M 81% meso-2,2-di(2'-tetrahydrofuryl)propane in hexane. Loss of the polymerization exotherm was observed. After 5 minutes from the loss of the exotherm, the polymerization was terminated by diluting the polymerization mixture with 6.0 ml isopropanol dissolved in 1360 g of hexane and dropping the diluted polymer cement into 11 L of isopropanol containing 5 g of 2,6-di-tert-butyl-4-methylphenol. The coagulated polymer was drum-dried to yield 161.9 g (12.4% yield) of isolated polymer product.

The resulting polymer had the following properties: $ML_{1+4}$=24.7, Mn=127 kg/mol, Mw=229 kg/mol, Mw/Mn=1.8, cis-1,4-linkage content=99.0%, trans-1,4-linkage content=0.8%, 1,2-linkage content=0.2%.

Example 2

The same procedure that was used in Example 1 was used in Example 2 except 7.8 ml of 0.01 M 2,2-di(2'-tetrahydrofuryl) propane, containing a 50/50 mixture of meso and D,L diastereomers, in hexane was added to the polymerization instead of 81% meso-2,2-di(2'-tetrahydrofuryl) propane. Loss of the polymerization exotherm was not observed upon the addition of 2,2-di(2'-tetrahydrofuryl) propane. After 5 minutes from the addition of 2,2-di(2'-tetrahydrofuryl) propane, the polymerization was terminated by diluting the polymerization mixture with 6.0 ml isopropanol dissolved in 1360 g of hexane and dropping the diluted polymer cement into 11 L of isopropanol containing 5 g of 2,6-di-tert-butyl-4-methylphenol. The coagulated polymer was drum-dried to yield 184.7 g (14.2% yield) of isolated polymer product.

The resulting polymer had the following properties: $ML_{1+4}$=28.7, Mn=131 kg/mol, Mw=235 kg/mol, Mw/Mn=1.8, cis-1,4-linkage content=99.0%, trans-1,4-linkage content=0.8%, 1,2-linkage content=0.2%.

Comparing Example 1 to Example 2, the addition of meso-2,2-di(2'-tetrahydrofuryl) propane arrested the polymerization as indicated by the loss of polymerization exotherm, decreased conversion, and decreased $ML_{1+4}$.

Example 3

The same procedure that was used in Example 1 was used in Example 3 except the addition of meso-2,2-di(2'-tetrahydrofuryl) propane was omitted. After 17.5 minutes from the addition of the catalyst, the polymerization was terminated by diluting the polymerization mixture with 6.0 ml isopropanol dissolved in 1360 g of hexane and dropping the diluted polymer cement into 11 L of isopropanol containing 5 g of 2,6-di-tert-butyl-4-methylphenol. The coagulated polymer was drum-dried to yield 157.1 g (12.1% yield) of isolated polymer product.

The resulting polymer had the following properties: $ML_{1+4}$=23.0, Mn=122 kg/mol, Mw=233 kg/mol, Mw/Mn=1.9, cis-1,4-linkage content=99.0%, trans-1,4-linkage content=0.8%, 1,2-linkage content=0.2%.

Comparing Example 1 to Example 3, the addition of meso-2,2-di(2'-tetrahydrofuryl) propane arrested the polymerization as indicated by the similar polymerization conversions obtained in the two polymerizations.

Comparing Example 2 to Example 3, the addition of 2,2-di(2'-tetrahydrofuryl) propane did not arrest the polymerization as indicated by the increase polymerization conversion in Example 2.

Example 4

The same procedure that was used in Example 1 was used in Example 4 except 19.5 ml of 0.01 M 2,2-di(2'-tetrahydrofuryl) propane, containing a 50/50 mixture of meso and D,L diastereomers, in hexane was added to the polymerization instead of 81% meso-2,2-di(2'-tetrahydrofuryl) propane. Loss of the polymerization exotherm was observed upon the addition of 2,2-di(2'-tetrahydrofuryl) propane. After 5 minutes from the addition of 2,2-di(2'-tetrahydrofuryl) propane, the polymerization was terminated by diluting the polymerization mixture with 6.0 ml isopropanol dissolved in 1360 g of hexane and dropping the diluted polymer cement into 11 L of isopropanol containing 5 g of 2,6-di-tert-butyl-4-methylphenol. The coagulated polymer was drum-dried to yield 173.5 g (13.3% yield) of isolated polymer product.

The resulting polymer had the following properties: $ML_{1+4}$=25.8, Mn=124 kg/mol, Mw=234 kg/mol, Mw/Mn=1.9, cis-1,4-linkage content=99.0%, trans-1,4-linkage content=0.8%, 1,2-linkage content=0.2%.

Comparing Example 1 to Example 4, it required the addition of an increased amount of 2,2-di(2'-tetrahydrofuryl) propane containing all stereocenters than meso-2,2-di(2'-tetrahydrofuryl) propane to stop the polymerization as indicated by the loss of polymerization exotherm. This corresponds to a 2,2-di(2'-tetrahydrofuryl) propane/neodymium of 5/1 and a meso-2,2-di(2'-tetrahydrofuryl) propane/neodymium of 2/1 to arrest the polymerization.

Example 5

The same procedure that was used in Example 1 was used in Example 5 except 18.8 ml of 1.0 M 4,4'-bis(diethylamino)

benzophenone in toluene was added to the polymerization after 5.0 minutes from the addition of meso-2,2-di(2'-tetrahydrofuryl) propane. After 15 minutes from the addition of 4,4'-bis(diethylamino)benzophenone, the polymerization was terminated by diluting the polymerization mixture with 6.0 ml isopropanol dissolved in 1360 g of hexane and dropping the diluted polymer cement into 11 L of isopropanol containing 5 g of 2,6-di-tert-butyl-4-methylphenol. The coagulated polymer was drum-dried to yield 163.7 g (12.5% yield) of isolated polymer product.

The resulting polymer had the following properties: $ML_{1+4}$=25.3, Mn=120 kg/mol, Mw=248 kg/mol, Mw/Mn=2.0, cis-1,4-linkage content=99.1%, trans-1,4-linkage content=0.7%, 1,2-linkage content=0.2%. The modification of the polymer with 4,4'-bis(diethylamino)benzophenone allowed for the determination of percent functionality which was measured to be 90%. The incorporation of 4,4'-bis(diethylamino)benzophenone into the chain end of the polymer shows that the addition of meso-2,2-di(2'-tetrahydrofuryl) propane allows for the modification of the polymer following the arrest of the polymerization.

Example 6

The same procedure that was used in Example 3 was used in Example 6 except 18.8 ml of 1.0 M 4,4'-bis(diethylamino) benzophenone in toluene was added to the polymerization after 17.5 minutes from the commencement of the polymerization. After 15 minutes from the addition of 4,4'-bis (diethylamino)benzophenone, the polymerization was terminated by diluting the polymerization mixture with 6.0 ml isopropanol dissolved in 1360 g of hexane and dropping the diluted polymer cement into 11 L of isopropanol containing 5 g of 2,6-di-tert-butyl-4-methylphenol. The coagulated polymer was drum-dried to yield 167.5 g (12.9% yield) of isolated polymer product.

The resulting polymer had the following properties: $ML_{1+4}$=21.4, Mn=115 kg/mol, Mw=228 kg/mol, Mw/Mn=2.0, cis-1,4-linkage content=99.0%, trans-1,4-linkage content=0.8%, 1,2-linkage content=0.2%. The modification of the polymer with 4,4'-bis(diethylamino)benzophenone allowed for the determination of percent functionality which was measured to be 88%.

Comparing Example 5 to Example 6, addition of meso-2,2-di(2'-tetrahydrofuryl) propane preserves the reactivity of the chain ends of the polymer and provides the same percent functionality as a polymerization that has not been treated with meso-2,2-di(2'-tetrahydrofuryl) propane.

Example 7

The same procedure that was used in Example 1 was used in Example 7 except 3.12 ml of a 1.0 M 2-pyridinecarbonitrile in toluene was added to the polymerization after 5.0 minutes from the addition of meso-2,2-di(2'-tetrahydrofuryl) propane. After 15 minutes from the addition of 2-pyridinecarbonitrile, the polymerization was terminated by diluting the polymerization mixture with 6.0 ml isopropanol dissolved in 1360 g of hexane and dropping the diluted polymer cement into 11 L of isopropanol containing 5 g of 2,6-di-tert-butyl-4-methylphenol. The coagulated polymer was drum-dried to yield 169.9 g (13.0% yield) of isolated polymer product.

The resulting polymer had the following properties: $ML_{1+4}$=49.3, Mn=130 kg/mol, Mw=250 kg/mol, Mw/Mn=1.9, cis-1,4-linkage content=99.0%, trans-1,4-linkage content=0.7%, 1,2-linkage content=0.3%.

Example 7 shows that polymerizations treated with meso-2,2-di(2'-tetrahydrofuryl) propane can be modified with small molecules, such as 2-pyridinecarbonitrile, which provide an increase in $ML_{1+4}$. Comparing Example 7 to Example 1, addition of 2-pyridinecarbonitrile provided an increase in $ML_{1+4}$ of 25 $ML_{1+4}$ units.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A method of polymerization, the method comprising the steps of:
    (a) polymerizing a conjugated diene monomer in the presence of a coordination catalyst to form a reactive polymer having an active terminus; and
    (b) inhibiting said step of polymerizing with a Lewis base selected from the group consisting of:

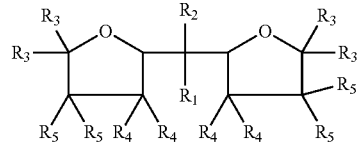

wherein R1 and R2 independently are hydrogen or an alkyl group and a total number of carbon atoms in —CR1R2— ranges between one and nine inclusive; R3, R4, and R5 independently are —H or —CnH2n+1 wherein n=1 to 6,
    wherein at least 60% by weight of the Lewis base comprises a meso-isomer.

2. The method of claim 1, the method further comprising reacting the reactive polymer at its active terminus with a functionalizing agent.

3. The method of claim 1, wherein the coordination catalyst is utilized in an amount
    of about 0.001 mmol to about 1 mmol of coordination catalyst per 100 g of conjugated diene monomer.

4. The method of claim 1, wherein the meso-isomer Lewis base is
    utilized in an amount of less than 0.008 mmol of meso-isomer Lewis base per 100 g of conjugated diene monomer.

5. The method of claim 1, wherein a molar ratio of the meso-isomer Lewis base to the coordination catalyst is from about 1:1 to 5:1.

6. The method of claim 1, wherein a molar ratio of the meso-isomer Lewis base to the coordination catalyst is less than 3:1.

7. The method of claim 1, wherein said step of inhibiting substantially reduces a rate at which the conjugated diene monomer is polymerized while maintaining an ability of the active terminus to react with a functionalizing agent.

8. The method of claim 1, wherein said step of inhibiting ceases polymerization of the conjugated diene monomer.

9. The method of claim 1, wherein at least about 80% by weight of the Lewis base comprises the meso-isomer.

10. The method of claim 1, wherein at least about 90% by weight of the Lewis base comprises the meso-isomer.

11. The method of claim 1, wherein the coordination catalyst includes a lanthanide-based catalyst.

12. The method of claim 1, wherein the coordination catalyst includes a neodymium-based catalyst.

13. The method of claim 1, wherein the conjugated diene monomer is 1,3-butadiene that forms cis-1,4-polybutadiene.

14. The method of claim 1, wherein step (a) is carried out in the presence of less than 20 percent by weight of organic solvent based on a total weight of conjugated diene monomer, organic solvent and resulting reactive polymer.

15. A method of preparing a polymer, the method comprising the steps of:
   (a) polymerizing a conjugated diene monomer in the presence of a lanthanide-based coordination catalyst to form a reactive polymer having an active terminus;
   (b) inhibiting said step of polymerizing with a Lewis base selected from the group consisting of:

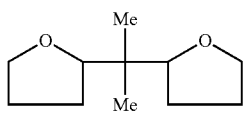

wherein at least 60% by weight of the Lewis base comprises a meso-isomer (c) reacting the polymer at its active terminus with a functionalizing agent.

16. The method of claim 15, wherein the coordination catalyst comprises a neodymium-based catalyst.

17. The method of claim 15, wherein at least 80% by weight of the Lewis base comprises the meso-isomer.

18. The method of claim 15, wherein step (a) is carried out in the presence of less than 20 percent by weight of organic solvent based on a total weight of conjugated diene monomer, organic solvent and resulting reactive polymer.

19. The method of claim 15, wherein step (a) is carried out in the presence of less than 5 percent by weight of organic solvent based on a total weight of conjugated diene monomer, organic solvent and resulting reactive polymer.

20. The method of claim 15, wherein the meso-isomer Lewis base is utilized in an amount of less than 0.008 mmol of catalyst per 100 g of monomer and a molar ratio of the meso-isomer Lewis base to the lanthanide-based coordination catalyst is less than 3:1.

* * * * *